United States Patent
Shiga

(10) Patent No.: US 7,728,822 B2
(45) Date of Patent: Jun. 1, 2010

(54) TOUCH-PANEL INPUT DEVICE HAVING A FUNCTION FOR PROVIDING VIBRATION AND METHOD FOR PROVIDING VIBRATION IN RESPONSE TO INPUT OPERATION

(75) Inventor: Masayoshi Shiga, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1414 days.

(21) Appl. No.: 11/132,158

(22) Filed: May 18, 2005

(65) Prior Publication Data

US 2006/0022958 A1 Feb. 2, 2006

(30) Foreign Application Priority Data

Jul. 28, 2004 (JP) .............................. 2004-219963

(51) Int. Cl.
*G06F 3/041* (2006.01)
(52) U.S. Cl. ..................................... 345/173; 178/18.04
(58) Field of Classification Search .................. 345/173, 345/156; 178/18.01–18.04
See application file for complete search history.

(56) References Cited

U.S. PATENT DOCUMENTS

| | | | |
|---|---|---|---|
| 6,429,846 B2 | 8/2002 | Rosenberg et al. | |
| 6,504,530 B1 * | 1/2003 | Wilson et al. | 345/173 |
| 7,292,227 B2 * | 11/2007 | Fukumoto et al. | 345/173 |
| 2005/0110768 A1 * | 5/2005 | Marriott et al. | 345/173 |

* cited by examiner

*Primary Examiner*—Amare Mengistu
*Assistant Examiner*—Insa Sadio
(74) *Attorney, Agent, or Firm*—Brinks Hofer Gilson & Lione

(57) ABSTRACT

A touch-panel input device having a function for providing vibrations includes a touch panel receiving an operation on an operation item on a display panel, a vibration-controlling unit vibrating the touch panel, an operation detector detecting an operation on the touch panel, and an operation-mode controlling unit setting an operation mode of the touch panel to an input operation mode for vibrating the touch panel upon detecting a touch on the touch panel, or either a speaker mode for vibrating the touch panel to produce sounds or a microphone mode for allowing voice input by transmitting vibrations generated on the touch panel when the operator speaks to the touch panel. The operation-mode controlling unit changes the operation mode to the input operation mode when the operation mode is set to the speaker mode or the microphone mode upon detecting an operation on the touch panel.

16 Claims, 12 Drawing Sheets

FIG. 3A
FIG. 3B
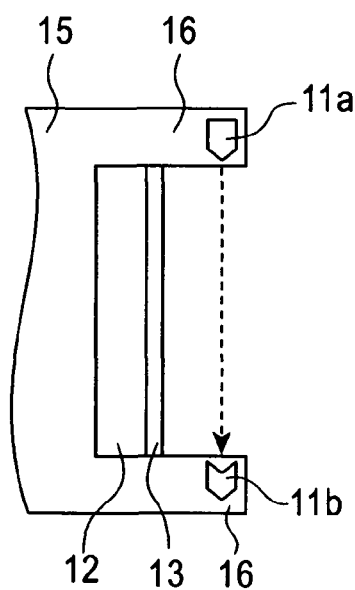
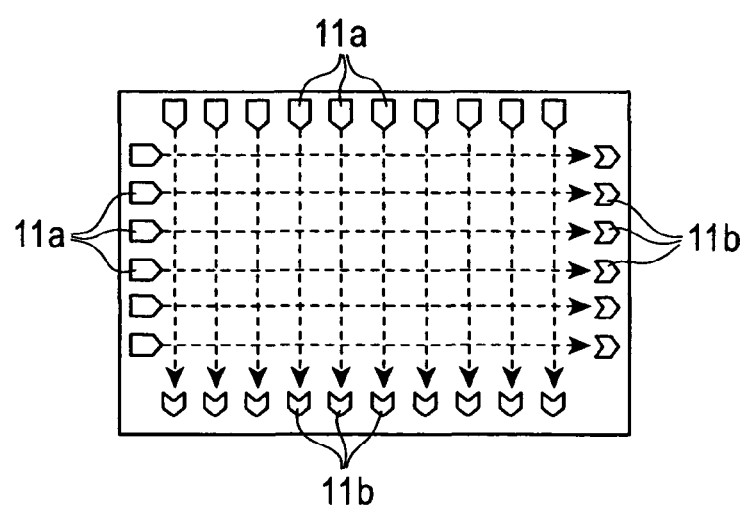

TOUCH-PANEL INPUT DEVICE HAVING A FUNCTION FOR PROVIDING VIBRATION AND METHOD FOR PROVIDING VIBRATION IN RESPONSE TO INPUT OPERATION

BACKGROUND OF THE INVENTION

1. Field of the Invention

The present invention relates to touch-panel input devices having functions for providing vibrations and methods for providing vibrations in response to input operations, and more particularly to an input device having a force-feedback (FFB) function for providing vibrations to a user when the user operates a touch panel.

2. Description of the Related Art

A touch-panel input device A touch-panel input device including a panel-shaped input operation unit on the surface of a liquid crystal display is known. In Japanese Unexamined Patent Application Publication No. 8-221173, a touch-panel input device is disclosed. This touch-panel input device has a function for providing vibrations to an operator through a vibrator when the operator touches a switch displayed on a screen of a touch panel to inform the operator of, for example, a position and the type of the switch, i.e., an FFB function. Hereinafter, this type of touch-panel input device is referred to as an FFB touch panel.

Moreover, a device for generating sounds by vibrating a transparent panel on the front surface of a liquid crystal screen as a speaker is known. Hereinafter, this type of device is referred to as a panel-type speaker. Moreover, a device serving as a microphone for inputting speech by transmitting vibrations generated on a transparent panel on the front surface of a liquid crystal screen when a user speaks to the liquid crystal screen is known. Hereinafter, this type of device is referred to as a panel-type microphone.

When a device includes a touch panel serving as both the FFB touch panel and the panel-type speaker described above, the device vibrates the touch panel to provide force feedback to a user and to generate voice output. In this case, when this touch panel is used as a speaker by vibrating the touch panel and the user operates a switch displayed on the touch panel at the same time, vibrations of the speaker cannot be distinguished from those of force feedback. Thus, vibrations corresponding to the operation of the switch cannot be smoothly transmitted to the user.

When a device includes a touch panel serving as both the FFB touch panel and the panel-type microphone described above, the device vibrates the touch panel to provide force feedback to a user and allows voice input by transmitting vibrations generated on the touch panel in response to the user's voice. In this case, when the touch panel is used as a microphone and the user operates a switch displayed on the touch panel at the same time, the touch panel may vibrate in response to the operation of the switch and the vibrations may be erroneously transmitted as voice input.

Accordingly, when the device includes a touch panel serving as the FFB touch panel and the panel-type speaker, an input operation mode and a speaker mode are set up as operation modes. In this arrangement, when the user performs an input operation using the touch panel as the FFB touch panel, the user must temporarily change the operation mode from the speaker mode to the input operation mode by, for example, operating a hardware key provided at a location other than the touch panel, the key serving as a mode-change switch.

Similarly, when the device includes a touch panel serving as the FFB touch panel and the panel-type microphone, the input operation mode and a microphone mode are set up as operation modes. In this arrangement, when the user performs the input operation using the touch panel as the FFB touch panel, the user must temporarily change the operation mode from the microphone mode to the input operation mode by, for example, operating a hardware key provided at a location other than the touch panel, the key serving as a mode-change switch.

In both cases, the user must operate the hardware key provided at the location other than the touch panel when the user performs the input operation using the touch panel as the FFB touch panel. Thus, the operation is disadvantageously complicated.

SUMMARY OF THE INVENTION

Accordingly, it is an object of the present invention to provide a touch-panel input device for smoothly providing vibrations representing force feedback to an operator without a complicated operation even while a touch panel is used as a speaker.

It is another object of the present invention to provide a touch-panel input device for preventing vibrations representing force feedback from being erroneously transmitted as voice input without a complicated operation even while a touch panel is used as a microphone.

To solve the problems described above, a touch-panel input device having a function for providing vibrations according to a first aspect of the present invention is provided. This touch-panel input device includes a touch panel for receiving an operation on an operation item displayed on a display panel, a vibration-controlling unit for vibrating the touch panel, an operation detector for detecting an operation on the touch panel, and an operation-mode controlling unit for setting an operation mode of the touch panel to an input operation mode for vibrating the touch panel by the vibration-controlling unit upon detecting a touch of an operator on the touch panel, or either a speaker mode for vibrating the touch panel by the vibration-controlling unit to produce sounds or a microphone mode for allowing voice input by transmitting vibrations generated on the touch panel when the operator speaks to the touch panel. The operation-mode controlling unit changes the operation mode to the input operation mode when the operation mode is set to the speaker mode or the microphone mode upon detecting an operation on the touch panel by the operation detector.

A touch-panel input device having a function for providing vibrations according to a second aspect of the present invention is provided. This touch-panel input device includes a touch panel for receiving an operation on an operation item displayed on a display panel, an operation detector for detecting an operation on the touch panel, and a vibration-controlling unit for vibrating the touch panel upon detecting a touch of an operator on the touch panel and for vibrating the touch panel so as to produce sounds. The vibration-controlling unit controls the magnitude of vibrations for producing the sounds so as to be less than the magnitude of vibrations for force feedback in response to a touch of the operator on the touch panel while the touch panel vibrates to produce the sounds, upon detecting an operation on the touch panel by the operation detector.

A touch-panel input device having a function for providing vibrations according to a third aspect of the present invention is provided. This touch-panel input device includes a touch panel for receiving an operation on an operation item displayed on a display panel, an operation detector for detecting an operation on the touch panel, and a vibration-controlling unit for vibrating the touch panel upon detecting a touch of an operator on the touch panel and for vibrating the touch panel so as to produce sounds. The vibration-controlling unit generates the sounds based on a frequency band of vibrations for producing the sounds that does not include a frequency band of vibrations for force feedback in response to a touch of the operator on the touch panel while the touch panel vibrates to produce the sounds, upon detecting an operation on the touch panel by the operation detector.

The operation detector may include an infrared sensor near the touch panel.

The operation detector may include a heat sensor near the touch panel and may determine that the operator operates the touch panel when the heat sensor detects an increase in temperature around the touch panel.

The operation detector may include a motion sensor for detecting the three-dimensional motion of an object in space and may determine that the operator operates the touch panel when a predetermined motion of the operator in the space is detected.

The operation detector may include a touch sensor included in the touch panel and may determine that the operator operates the touch panel when the touch sensor detects a touch on the touch panel.

In the touch-panel input device according to the first aspect of the present invention, for example, when the operator brings his or her finger close to the touch panel to operate the touch panel, the sensor detects this operation. Then, the operation mode is automatically changed from the speaker mode or the microphone mode to the input operation mode. Thus, the operation mode can be readily changed from the speaker mode or the microphone mode to the input operation mode without operating a hardware key other than the touch panel even while the touch panel is used as a speaker or a microphone. Accordingly, vibrations representing force feedback can be smoothly provided to the operator without a complicated operation even while the touch panel is used as a speaker. Moreover, vibrations representing force feedback can be prevented from being erroneously transmitted as voice input without a complicated operation even while the touch panel is used as a microphone.

In the touch-panel input device according to the second aspect of the present invention, for example, when the operator brings his or her finger close to the touch panel to operate the touch panel, the sensor detects this operation. Then, the magnitude of the vibrations of the touch panel for providing force feedback is adjusted so as to be larger than that for producing the sounds. Thus, the vibrations representing force feedback can be smoothly provided to the operator without operating a hardware key other than the touch panel even while the touch panel is used as a speaker.

In the touch-panel input device according to the third aspect of the present invention, for example, when the operator brings his or her finger close to the touch panel to operate the touch panel, the sensor detects this operation. Then, the frequency band of vibrations for force feedback is removed from the frequency band of vibrations of the sounds to be produced. Thus, the vibrations of the touch panel for force feedback are clearly distinguished from the vibrations of the touch panel for producing the sounds. Accordingly, the vibrations for force feedback can be smoothly provided to the operator without operating a hardware key other than the touch panel even while the touch panel is used as a speaker.

BRIEF DESCRIPTION OF THE DRAWINGS

FIGS. 3A and 3B illustrate a typical layout of an infrared sensor;

DESCRIPTION OF THE PREFERRED EMBODIMENTS

Figure 1:
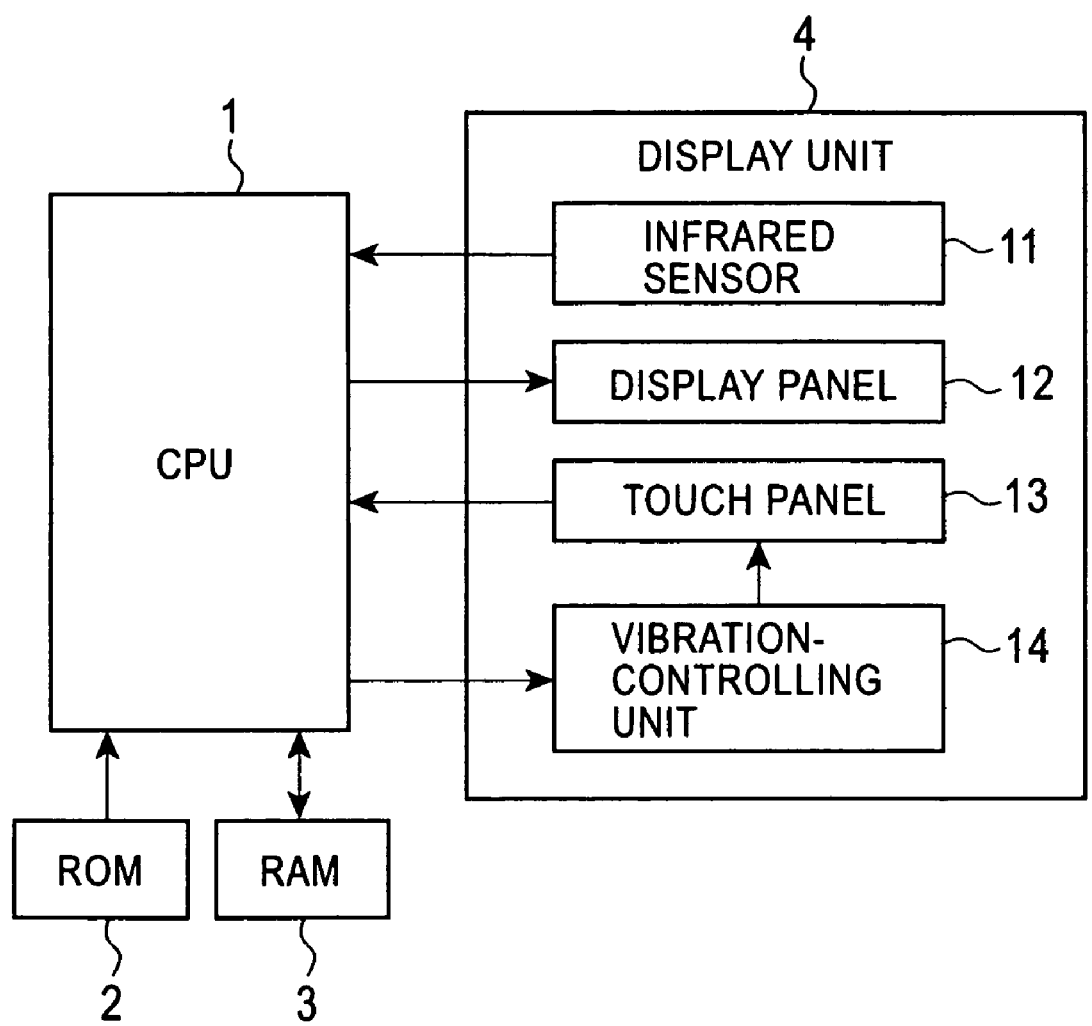
FIG. 1 is a block diagram illustrating the structure of a typical touch-panel input device having a function for providing vibrations according to a first embodiment.
Figure 2:
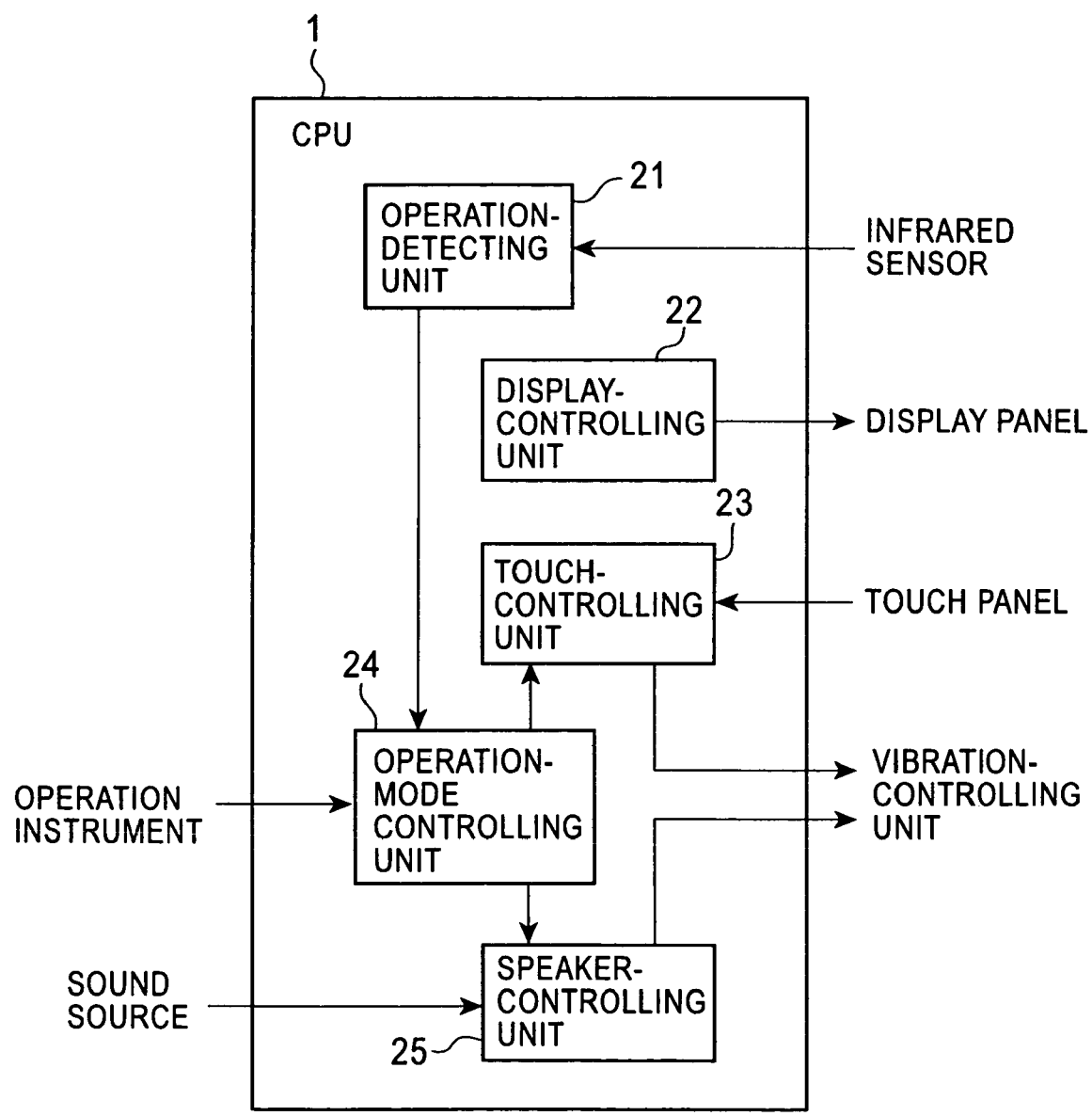
FIG. 2 is a block diagram illustrating the structure of a typical CPU according to the first embodiment.

A first embodiment according to the present invention will now be described with reference to the drawings. FIG. 1 is a block diagram illustrating the structure of a typical touch-panel input device having a function for providing vibrations according to the first embodiment. FIG. 2 is a block diagram illustrating the structure of a typical CPU 1 shown in FIG. 1. FIGS. 3A and 3B illustrate a typical layout of an infrared sensor 11 shown in FIG. 1.

As shown in FIG. 1, the touch-panel input device includes the CPU 1, a ROM 2, a RAM 3, and a display unit 4. The display unit 4 includes the infrared sensor 11, a display panel 12, a touch panel 13, and a vibration-controlling unit 14.

The CPU 1 controls the overall process of the touch-panel input device. This control process will be described below with reference to FIG. 2. The ROM 2 stores programs performing various types of processes on the CPU 1. The RAM 3 temporarily stores intermediate data and output data that are generated in the processes on the CPU 1. That is, the CPU 1 executes the programs stored in the ROM 2 using the RAM 3 as a work memory to perform the processes as described below.

The display panel 12 displays, for example, an operation menu including a plurality of operation items and various types of images generated in applications performed in an electronic device to which the touch-panel input device according to the first embodiment is applied. The touch panel 13 receives a user's operation on an operation item in the operation menu displayed on the operation panel 12. When a user touches any position on the touch panel 13, the touch panel 13 sends touch-detection signals to the CPU 1. For example, a resistive-film type or an infrared type of touchpad can be used as the touch panel 13 to detect the user's touch on the touch panel 13.

The vibration-controlling unit 14 vibrates the touch panel 13 in response to commands from the CPU 1. The touch panel 13 according to the first embodiment has the following two operation modes: an input operation mode (an FFB mode) in which the touch panel 13 vibrates in response to the user's touch on the touch panel 13 and a speaker mode in which the touch panel 13 vibrates as a speaker to produce sounds. The vibration-controlling unit 14 controls the touch panel 13 vibrating in these two operation modes.

The infrared sensor 11 is an element that detects predetermined user's operations on the touch panel 13 and includes, for example, a plurality of infrared-emitting units 11a and a plurality of infrared-receiving units 11b, as shown in FIG. 3B. The infrared-emitting units 11a are disposed along at least one edge of a display housing 15 including the touch panel 13 (in FIG. 3B, two edges orthogonal to each other). The infrared-receiving units 11b are disposed along edges opposing the edges along which the infrared-emitting units 11a are disposed so as to oppose the infrared-emitting units 11a.

The four edges of the display housing 15 constitute a frame 16 supporting the display panel 12 and the touch panel 13. As shown in FIG. 3A, the frame 16 has a predetermined depth and holds the display panel 12 and the touch panel 13 at the bottom. The infrared-emitting units 11a and the infrared-receiving units 11b are embedded in the top of the frame 16. The distance between the surface of the touch panel 13 and the infrared sensor 11 is, for example, about 10 mm.

Next, the structure of the CPU 1 will now be described with reference to FIG. 2. The CPU 1 includes an operation-detecting unit 21, a display-controlling unit 22, a touch-controlling unit 23, an operation-mode controlling unit 24, and a speaker-controlling unit 25.

The display-controlling unit 22 controls displaying the operation menu and the various types of images on the display panel 12.

The touch-controlling unit 23 detects coordinates of a position on the touch panel 13 touched by the user. The CPU 1 determines that an operation item displayed on the detected coordinates is pressed by the user and performs a predetermined process assigned to the operation item. The touch-controlling unit 23 also sends a command signal for generating vibrations to the vibration-controlling unit 14 to generate vibrations having a predetermined frequency on the touch panel 13 in response to the user's touch on the touch panel 13.

The speaker-controlling unit 25 sends a command signal for generating vibrations to the vibration-controlling unit 14 to generate vibrations on the touch panel 13. These vibrations have a frequency corresponding to audio signals supplied from a sound source in the electronic device to which the touch-panel input device according to the first embodiment is applied.

The operation-detecting unit 21 detects the user's operation on the touch panel 13, based on signals supplied from the infrared sensor 11. The user's operation to be detected is an operation in which the user brings his or her finger close to the touch panel 13 to touch the touch panel 13. Specifically, it is determined that the user operates the touch panel 13 when infrared rays emitted from the infrared-emitting units 11a are intercepted by his or her finger.

That is, when the user brings his or her finger close to the touch panel 13, the infrared rays emitted from the infrared-emitting units 11a are intercepted by his or her finger and do not reach the infrared-receiving units 11b. This causes a change in the signals supplied from the infrared-receiving units 11b to the operation-detecting unit 21. The operation-detecting unit 21 determines that the user is operating the touch panel 13 upon detecting this change in the signals. The operation-detecting unit 21 and the infrared sensor 11 constitute an operation detector according to the present invention.

The operation-mode controlling unit 24 sets the operation mode to the input operation mode or the speaker mode described above. In the input operation mode, vibrations controlled by the speaker-controlling unit 25 are suppressed, and only vibrations controlled by the touch-controlling unit 23 are generated, these vibrations representing force feedback. Conversely, in the speaker mode, the vibrations controlled by the touch-controlling unit 23 are suppressed, and only the vibrations controlled by the speaker-controlling unit 25 are generated.

The operation-mode controlling unit 24 selects one of the operation modes described above depending on the user's operation using an operation instrument (not shown), for example, a remote controller, included in the electronic device to which the touch-panel input device according to the first embodiment is applied. When the operation mode is set to the speaker mode, the operation-mode controlling unit 24 automatically changes the operation mode from the speaker mode to the input operation mode upon detecting the user's operation on the touch panel 13 through the operation-detecting unit 21.

Figure 4:
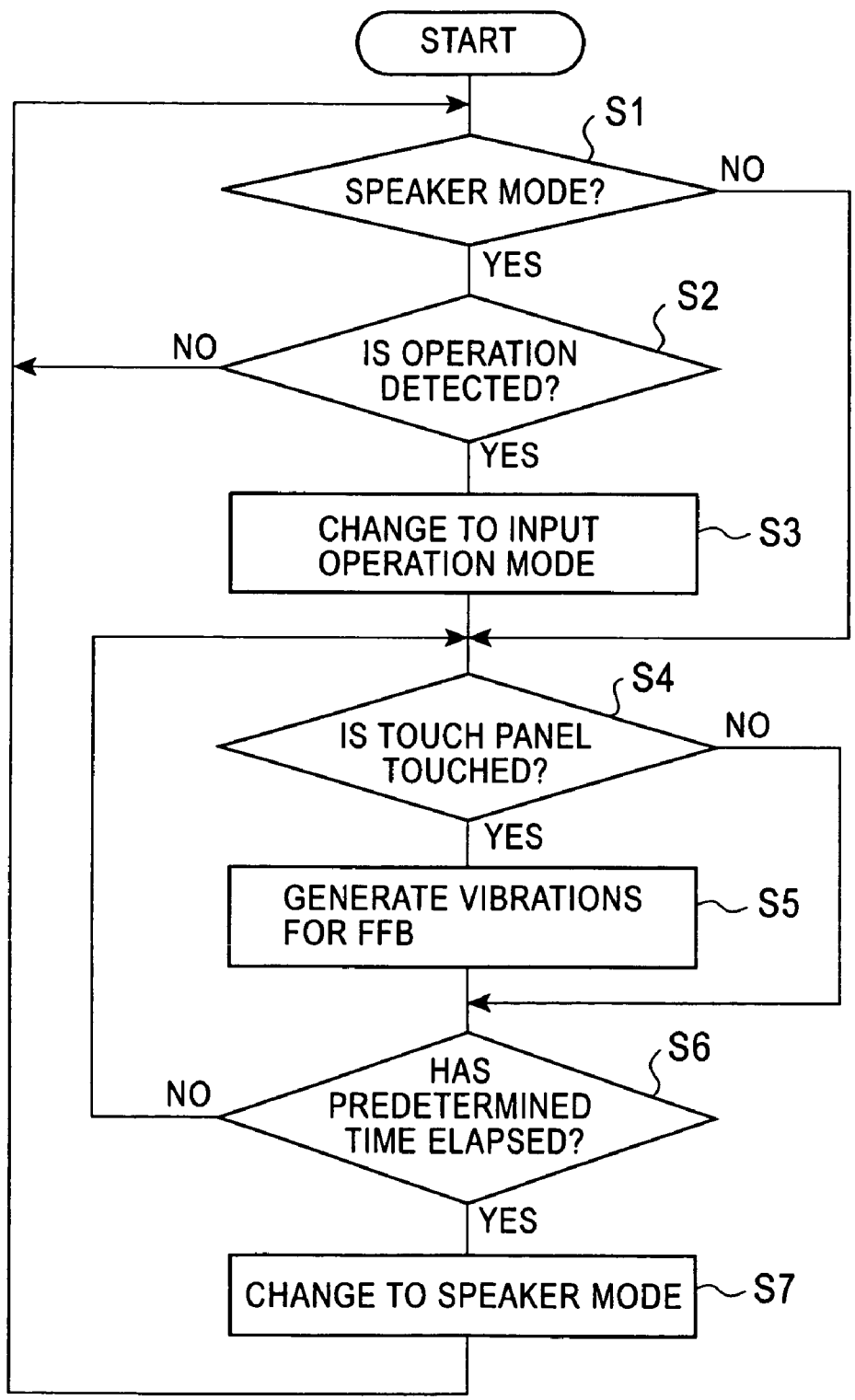
FIG. 4 is a flowchart illustrating a process for generating vibrations in response to a user's input operation according to the first embodiment.

The operation of the touch-panel input device according to the first embodiment will now be described. FIG. 4 is a flowchart illustrating a process for generating vibrations in response to the user's input operation according to the first embodiment. In step S1, the operation-mode controlling unit 24 determines whether the operation mode is set to the speaker mode. When the operation mode is set to the speaker mode, the process proceeds to step S2 where the operation-mode controlling unit 24 determines whether the operation-detecting unit 21 detects the user's operation on the touch panel 13.

When it is determined that the user does not operate the touch panel 13 in step S2, the process returns to step S1, and steps S1 and S2 are repeated. In this repetitive process, when the sound source in the electronic device supplies audio signals to the speaker-controlling unit 25, the vibration-controlling unit 14 generates vibrations on the touch panel 13 in response to the audio signals to produce sounds from the touch panel 13. On the other hand, when it is determined that the user operates the touch panel 13 in step S2, the process proceeds to step S3 where the operation-mode controlling unit 24 changes the operation mode from the speaker mode to the input operation mode.

Then, in step S4, the touch-controlling unit 23 determines whether the user touches the touch panel 13 after the operation mode is changed from the speaker mode to the input operation mode. When it is determined that the operation mode is not set to the speaker mode in step S1, that is, the operation mode is initially set to the input operation mode using the operation instrument, the process jumps to step S4.

When the touch-controlling unit 23 detects the user's touch on the touch panel 13, the process proceeds to step S5 where the touch-controlling unit 23 sends a command signal for generating vibrations to the vibration-controlling unit 14 in response to the user's touch on the touch panel 13 to vibrate the touch panel 13. Then, the vibration-controlling unit 14 vibrates the touch panel 13 at a predetermined frequency to inform the user that the user's operation on the touch panel 13 is recognized upon receiving the command signal.

Then, in step S6, the operation-mode controlling unit 24 determines whether a predetermined time, for example, five seconds, elapses after the operation mode is changed to the input operation mode. When the predetermined time does not elapse, the process returns to step S4, and steps S4 and S5 are repeated. On the other hand, when the predetermined time elapses, the process proceeds to step S7 where the operation-mode controlling unit 24 changes the operation mode from the input operation mode to the speaker mode. Moreover, when the predetermined time elapses without the user's operation on the touch panel 13 after the operation mode is changed from the speaker mode to the input operation mode, the operation mode is again changed to the speaker mode. Then, the process returns to step S1, and the process described above is repeated.

Figure 5:
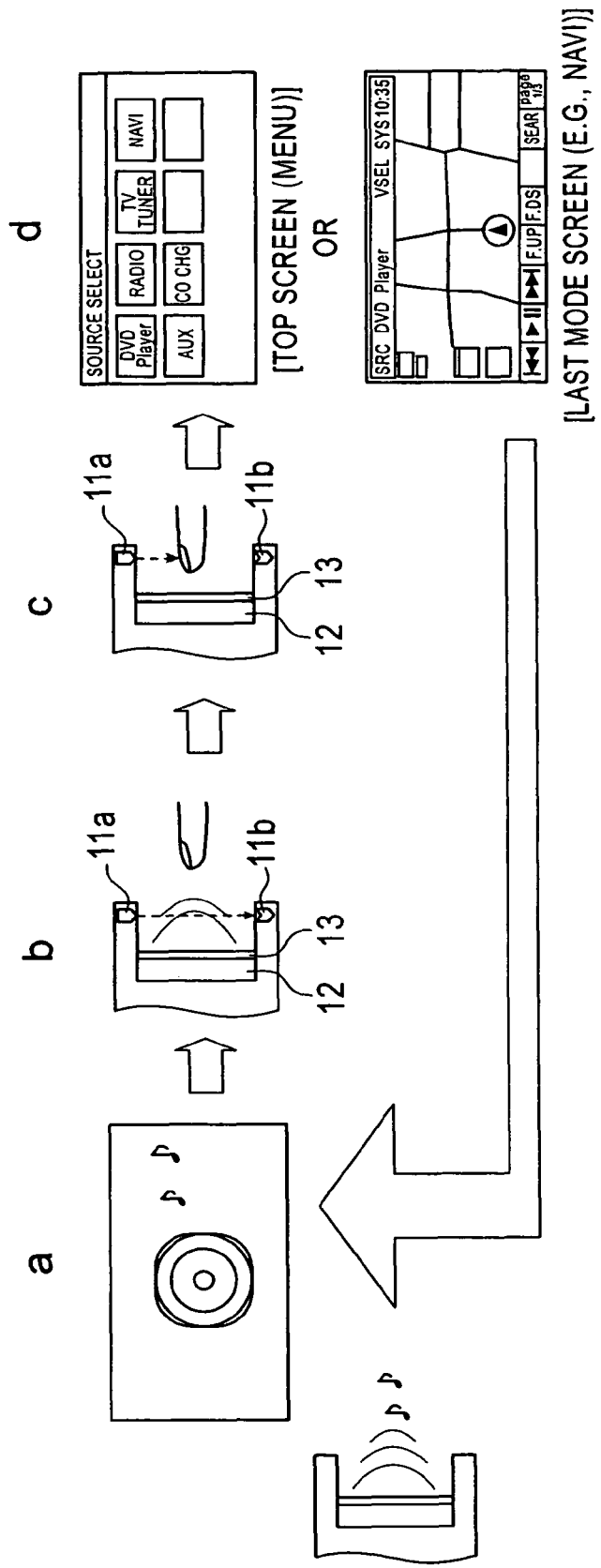
FIG. 5 is a state transition diagram illustrating the process shown in the flowchart of FIG. 4 and typical display screens.

FIG. 5 is a state transition diagram illustrating the process shown in the flowchart of FIG. 4 and typical display screens. In the operation shown in FIG. 5, the operation mode is initially set to the speaker mode by the operation-mode controlling unit 24. In the speaker mode, as shown in Part a of FIG. 5, an image of a speaker is displayed on the display panel 12, and the touch panel 13 vibrates to produce sounds. In this state, when the user brings his or her finger close to the touch panel 13 as shown in Part b of FIG. 5 and the infrared rays emitted from the infrared-emitting units 11a are intercepted by the finger as shown in Part c of FIG. 5, the operation-detecting unit 21 detects the user's operation.

When the operation-detecting unit 21 detects the user's operation, the operation-mode controlling unit 24 changes the operation mode from the speaker mode to the input operation mode. In the input operation mode, as shown in Part d of FIG. 5, the top screen of the operation menu prepared in the electronic device is displayed. Alternatively, a state that was displayed on the screen just before the process entered the speaker mode for the previous time may be stored in the RAM 3 or a nonvolatile memory (not shown), and the screen representing this state (this screen is referred to as a last mode screen) may be displayed.

In this input operation mode, the user operates any operation item to execute a corresponding application. When the operation mode is changed from the speaker mode to the input operation mode, the operation mode is set to the input operation mode for, e.g., five seconds. Then, after five seconds elapse, the operation mode is again changed to the speaker mode. The input operation mode is kept for five seconds after the user's operation is detected. Thus, immediately after the user temporarily moves his or her finger off the touch panel 13, the speaker mode screen is not displayed, and the user can operate the operation items.

When the user actually operates any operation item on the touch panel 13, the vibration-controlling unit 14 controls the touch panel 13 so that the touch panel 13 vibrates at a predetermined frequency to provide force feedback to the user to inform the user that the user's operation on the touch panel 13 is recognized. Then, five seconds after the last detected user's operation, the operation-mode controlling unit 24 changes the operation mode from the input operation mode to the speaker mode, and the screen shown in Part a of FIG. 5 is displayed.

As described above, in the first embodiment, when the operation mode is set to the speaker mode, the operation mode is automatically changed from the speaker mode to the input operation mode upon detecting the user's operation on the touch panel 13 through the infrared sensor 11. Thus, when the touch panel 13 is used as a speaker, the operation mode can be changed from the speaker mode to the input operation mode without operating a hardware key other than the touch panel 13 to suppress sounds from the touch panel 13. Accordingly, vibrations representing force feedback can be smoothly provided to the user without a complicated mode-switching operation even while the touch panel 13 is used as a speaker.

Figure 6:
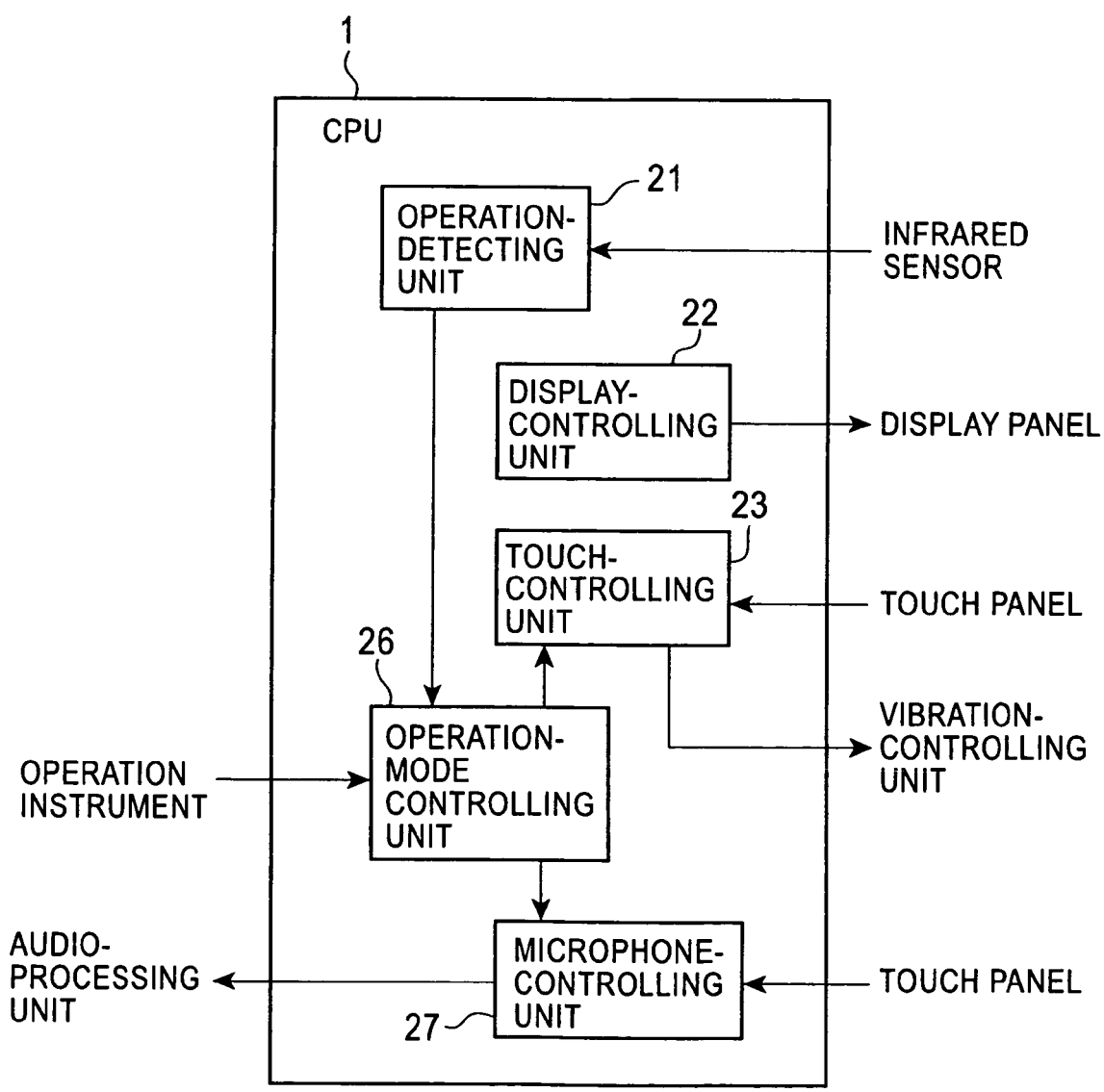
FIG. 6 is a block diagram illustrating the structure of a typical CPU according to a second embodiment.

A second embodiment according to the present invention will now be described with reference to the drawings. The structure of a touch-panel input device having a function for providing vibrations according to the second embodiment is the same as that shown in FIG. 1. FIG. 6 is a block diagram illustrating the structure of a typical CPU 1 according to the second embodiment. The layout of an infrared sensor 11 according to the second embodiment is the same as that shown in FIGS. 3A and 3B.

As shown in FIG. 6, the CPU 1 according to the second embodiment includes an operation-detecting unit 21, a display-controlling unit 22, a touch-controlling unit 23, an operation-mode controlling unit 26, and a microphone-controlling unit 27. Since the structure of the CPU 1 is the same as that shown in FIG. 2 except for the operation-mode controlling unit 26 and the microphone-controlling unit 27, a duplicated description is omitted.

A touch panel 13 according to the second embodiment has the following two operation modes: the input operation mode and a microphone mode that allows voice input by transmitting vibrations generated on the touch panel 13 when the user speaks to the touch panel 13. In the second embodiment, a vibration-controlling unit 14 shown in FIG. 1 controls vibrations of the touch panel 13 when the operation mode is set to the FFB mode.

The microphone-controlling unit 27 converts vibrations generated on the touch panel 13 when the user speaks to the touch panel 13 into audio data and sends this audio data to an audio-processing unit (not shown) in an electronic device to which the touch-panel input device according to the second embodiment is applied.

The operation-mode controlling unit 26 sets the operation mode to the input operation mode or the microphone mode described above. In the input operation mode, voice input through the microphone-controlling unit 27 is not accepted, but only vibrations controlled by the touch-controlling unit 23 are generated, these vibrations representing force feedback. Conversely, in the microphone mode, the vibrations controlled by the touch-controlling unit 23 are suppressed, and only voice input through the microphone-controlling unit 27 is accepted.

The operation-mode controlling unit 26 selects one of the operation modes described above depending on the user's operation using an operation instrument (not shown), for example, a remote controller, included in the electronic device to which the touch-panel input device according to the second embodiment is applied. When the operation mode is set to the microphone mode, the operation-mode controlling unit 26 automatically changes the operation mode from the microphone mode to the input operation mode upon detecting the user's operation on the touch panel 13 through the operation-detecting unit 21.

Figure 7:
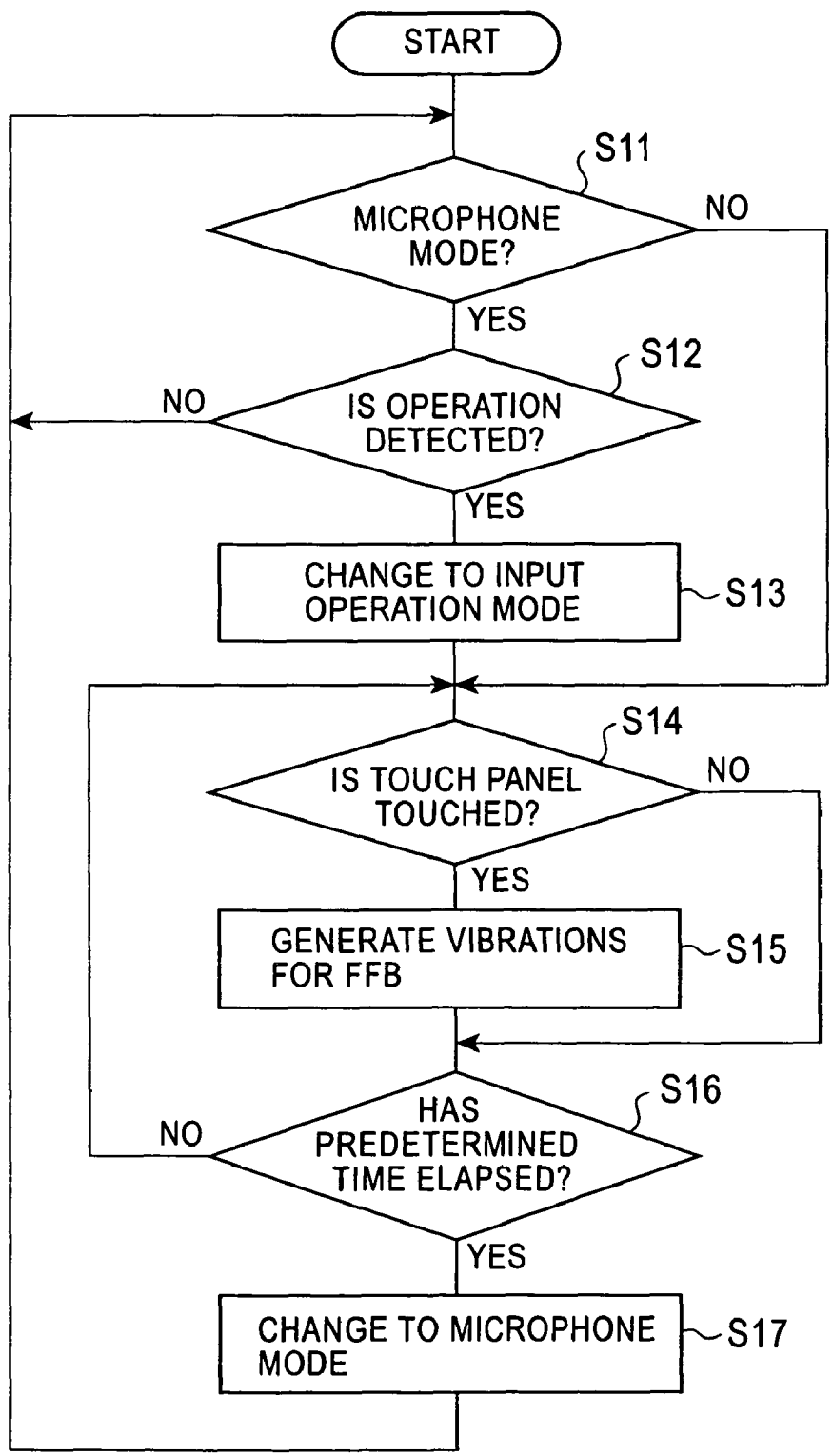
FIG. 7 is a flowchart illustrating a process for generating vibrations in response to a user's input operation according to the second embodiment.

The operation of the touch-panel input device according to the second embodiment will now be described. FIG. 7 is a flowchart illustrating a process for generating vibrations in response to the user's input operation according to the second embodiment. In step S11, the operation-mode controlling unit 26 determines whether the operation mode is set to the microphone mode. When the operation mode is set to the microphone mode, the process proceeds to step S12 where the operation-mode controlling unit 26 determines whether the operation-detecting unit 21 detects the user's operation on the touch panel 13.

When it is determined that the user does not operate the touch panel 13 in step S12, the process returns to step S11, and steps S11 and S12 are repeated. In this repetitive process, when the user speaks to the touch panel 13, the touch panel 13 vibrates, and the microphone-controlling unit 27 converts the vibrations to audio data and sends this audio data to the electronic device. On the other hand, when it is determined that the user operates the touch panel 13 in step S12, the process proceeds to step S13 where the operation-mode controlling unit 26 changes the operation mode from the microphone mode to the input operation mode.

Then, in step S14, the touch-controlling unit 23 determines whether the user touches the touch panel 13 after the operation mode is changed from the microphone mode to the input operation mode. When it is determined that the operation mode is not set to the microphone mode in step S11, that is, the operation mode is initially set to the input operation mode using the operation instrument, the process jumps to step S14.

When the touch-controlling unit 23 detects the user's touch on the touch panel 13, the process proceeds to step S15 where the touch-controlling unit 23 sends a command signal for generating vibrations to the vibration-controlling unit 14 in response to the user's touch on the touch panel 13 to vibrate the touch panel 13. Then, the vibration-controlling unit 14 vibrates the touch panel 13 at a predetermined frequency to inform the user that the user's operation on the touch panel 13 is recognized upon receiving the command signal.

Then, in step S16, the operation-mode controlling unit 26 determines whether a predetermined time, for example, five seconds, elapses after the operation mode is changed to the input operation mode. When the predetermined time does not elapse, the process returns to step S14, and steps S14 and S15 are repeated. On the other hand, when the predetermined time elapses, the process proceeds to step S17 where the operation-mode controlling unit 26 changes the operation mode from the input operation mode to the microphone mode. Moreover, when the predetermined time elapses without the user's operation on the touch panel 13 after the operation mode is changed from the microphone mode to the input operation mode, the operation mode is again changed to the microphone mode. Then, the process returns to step S11, and the process described above is repeated.

Figure 8:
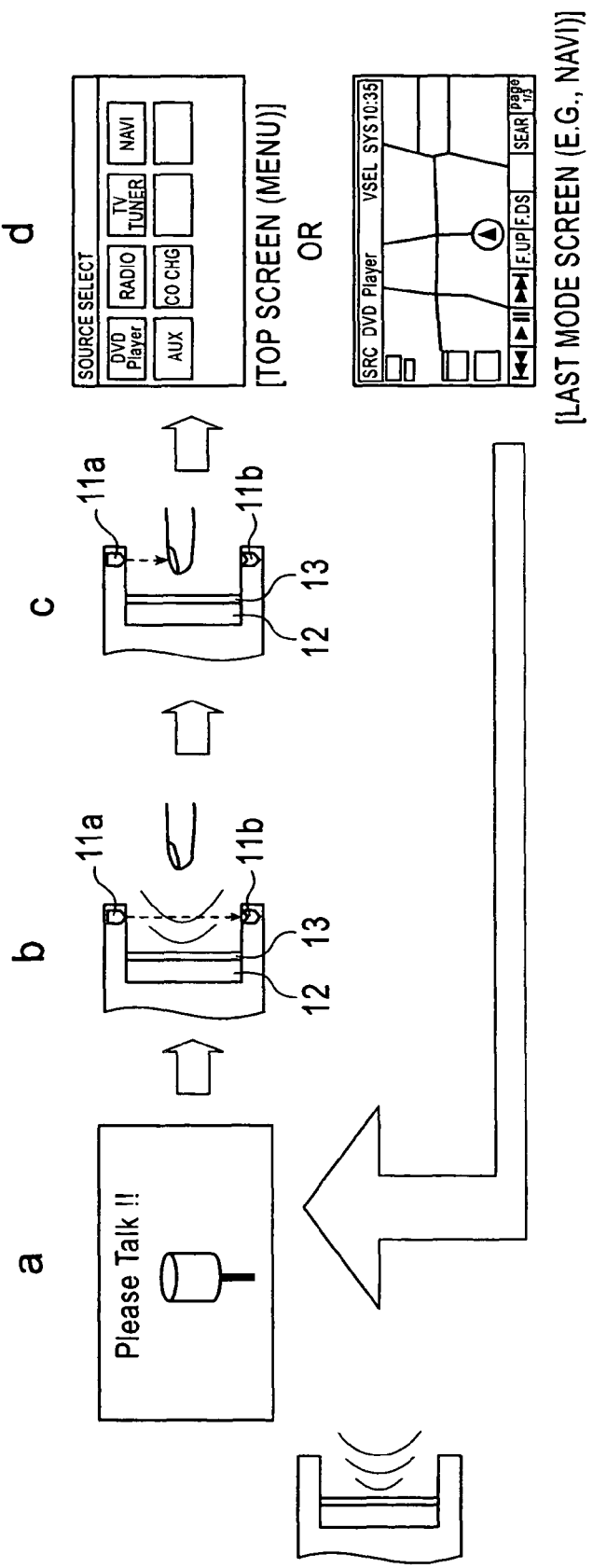
FIG. 8 is a state transition diagram illustrating the process shown in the flowchart of FIG. 7 and typical display screens.

FIG. 8 is a state transition diagram illustrating the process shown in the flowchart of FIG. 7 and typical display screens. In the operation shown in FIG. 8, the operation mode is initially set to the microphone mode by the operation-mode controlling unit 26. In the microphone mode, as shown in Part a of FIG. 8, an image of a microphone is displayed on the display panel 12, and vibrations on the touch panel 13 are transmitted to the electronic device as voice input. In this state, when the user brings his or her finger close to the touch panel 13 as shown in Part b of FIG. 8 and the infrared rays emitted from the infrared-emitting units 11a are intercepted by the finger as shown in Part c of FIG. 8, the operation-detecting unit 21 detects the user's operation.

When the operation-detecting unit 21 detects the user's operation, the operation-mode controlling unit 26 changes the operation mode from the microphone mode to the input operation mode. In the input operation mode, as shown in Part d of FIG. 8, the top screen of the operation menu prepared in the electronic device is displayed. Alternatively, a state that was displayed on the screen just before the process entered the microphone mode the previous time may be stored in the RAM 3 or a nonvolatile memory (not shown), and the screen representing this state (this screen is referred to as a last mode screen) may be displayed.

In this input operation mode, the user operates any operation item to execute a corresponding application. When the operation mode is changed from the microphone mode to the input operation mode, the operation mode is set to the input operation mode for, e.g., five seconds. Then, after five seconds elapse, the operation mode is again changed to the microphone mode. The input operation mode is kept for five seconds after the user's operation is detected. Thus, immediately after the user temporarily moves his or her finger off the touch panel 13, the microphone mode screen is not displayed, and the user can operate the operation items.

When the user actually operates any operation item on the touch panel 13, the vibration-controlling unit 14 controls the touch panel 13 so that the touch panel 13 vibrates at a predetermined frequency to provide force feedback to the user to inform the user that the user's operation on the touch panel 13 is recognized. Then, five seconds after the last detected user's operation, the operation-mode controlling unit 26 changes the operation mode from the input operation mode to the microphone mode, and the screen shown in Part a of FIG. 8 is displayed.

As described above, in the second embodiment, when the operation mode is set to the microphone mode, the operation mode is automatically changed from the microphone mode to the input operation mode upon detecting the user's operation on the touch panel 13 through the infrared sensor 11. Thus, when the touch panel 13 is used as a microphone, the operation mode can be changed from the microphone mode to the input operation mode without operating a hardware key other than the touch panel 13 to ignore voice input. Accordingly, vibrations representing force feedback can be prevented from being erroneously transmitted as voice input without a complicated mode-switching operation even while the touch panel 13 is used as a microphone.

Figure 9:
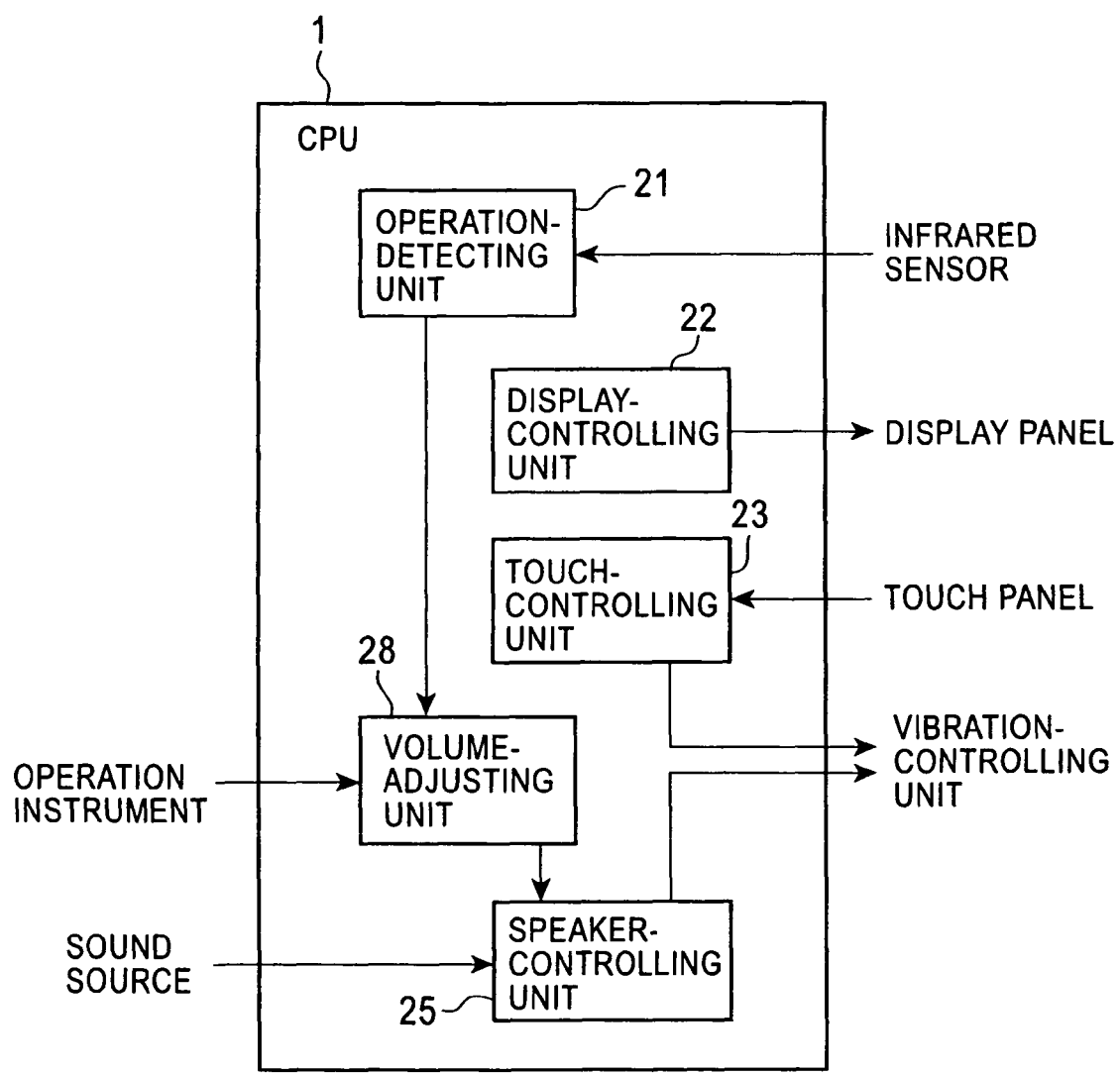
FIG. 9 is a block diagram illustrating the structure of a typical CPU according to a third embodiment.

A third embodiment according to the present invention will now be described with reference to the drawings. The structure of a touch-panel input device having a function for providing vibrations according to the third embodiment is the same as that shown in FIG. 1. FIG. 9 is a block diagram illustrating the structure of a typical CPU 1 according to the third embodiment. The layout of an infrared sensor 11 according to the third embodiment is the same as that shown in FIGS. 3A and 3B.

As shown in FIG. 9, the CPU 1 according to the third embodiment includes an operation-detecting unit 21, a display-controlling unit 22, a touch-controlling unit 23, a speaker-controlling unit 25, and a volume-adjusting unit 28. Since the structure of the CPU 1 is the same as that shown in FIG. 2 except for the volume-adjusting unit 28, a duplicated description is omitted.

In the third embodiment, there is no switching operation between the input operation mode (the FFB mode) and the speaker mode described above. A vibration-controlling unit 14 according to the third embodiment controls both vibrations of a touch panel 13 for producing sounds as a speaker and vibrations of the touch panel 13 for providing force feedback. The vibration-controlling unit 14 vibrates the touch panel 13 upon detecting a user's touch on the touch panel 13, and vibrates the touch panel 13 at a frequency corresponding to sounds to be produced when the touch panel 13 is used as a speaker.

The volume-adjusting unit 28 adjusts sound volume in response to a user's request using an operation instrument (not shown), for example, a remote controller, included in an electronic device to which the touch-panel input device according to the third embodiment is applied. When the touch panel 13 vibrates for producing sounds and when the operation-detecting unit 21 detects the user's operation on the touch panel 13, the volume-adjusting unit 28 decreases the volume of sounds produced from the speaker-controlling unit 25 so that the magnitude of vibrations for producing the sounds is less than that for providing force feedback.

Figure 10:
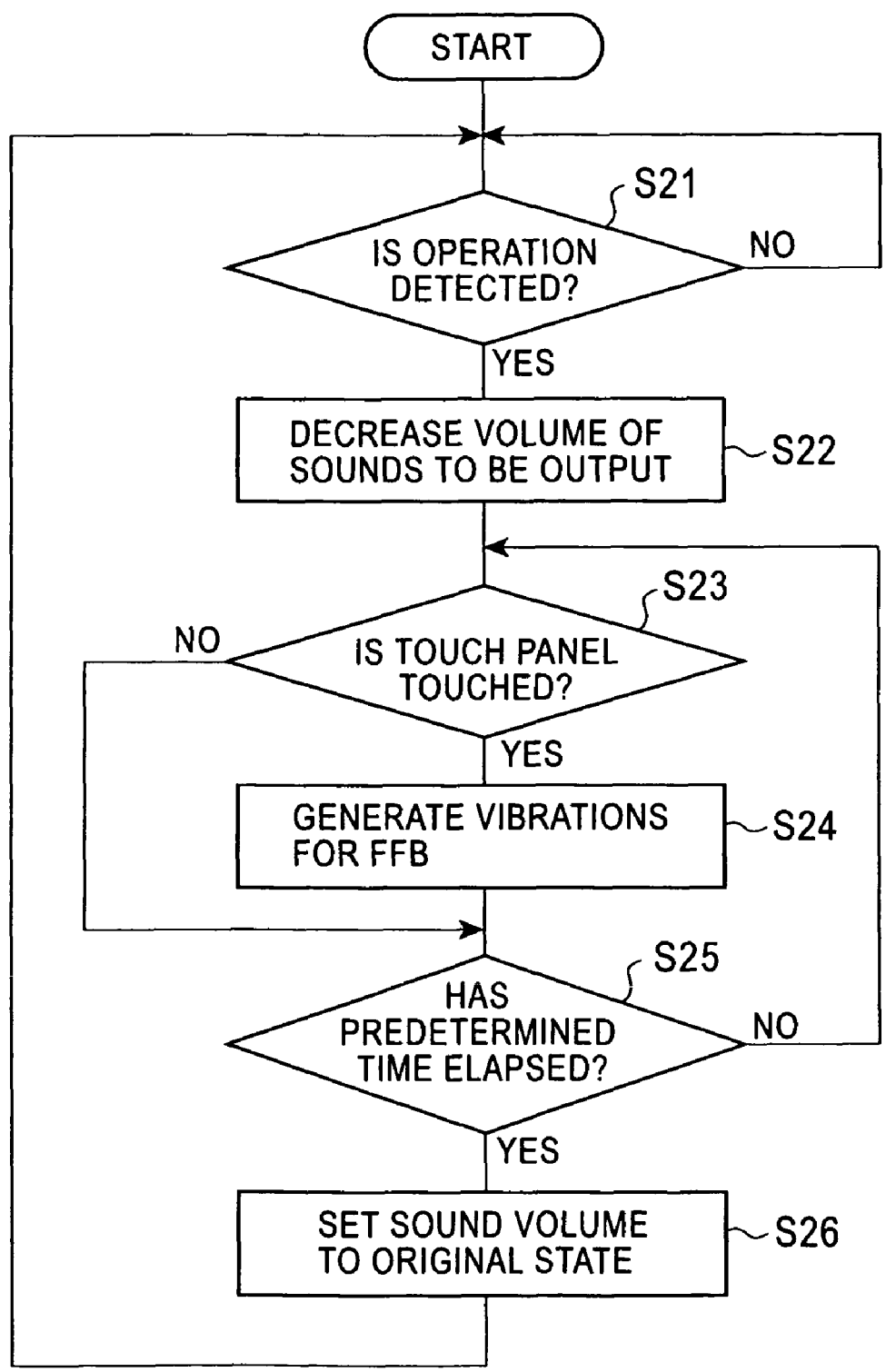
FIG. 10 is a flowchart illustrating a process for generating vibrations in response to a user's input operation according to the third embodiment.

The operation of the touch-panel input device according to the third embodiment will now be described. FIG. 10 is a flowchart illustrating a process for generating vibrations in response to the user's input operation according to the third embodiment. In step S21, the volume-adjusting unit 28 determines whether the operation-detecting unit 21 detects the user's operation on the touch panel 13.

When it is determined that the user does not operate the touch panel 13, step S21 is repeated. In this repetitive process, when a sound source in the electronic device supplies audio signals to the speaker-controlling unit 25, the vibration-controlling unit 14 generates vibrations on the touch panel 13 in response to the audio signals to produce sounds from the touch panel 13. The volume of sounds to be produced is set by operating the operation instrument in the electronic device. Specifically, the speaker-controlling unit 25 sends the vibration-controlling unit 14 a command signal for generating vibrations having a magnitude corresponding to the sound volume set by the volume-adjusting unit 28 through the operation of the operation instrument. Then, the vibration-controlling unit 14 generates vibrations on the touch panel 13 in response to this command signal.

On the other hand, when it is determined that the user operates the touch panel 13 in step S21, the process proceeds to step S22. In step S22, the volume-adjusting unit 28 decreases the volume of sounds to be produced so that the magnitude of vibrations generated on the touch panel 13 for producing the sounds is less than that for providing force feedback in response to the user's touch on the touch panel 13. When the sound volume is initially set small and the magnitude of the vibrations for producing the sounds is already smaller than that for providing force feedback, this sound volume is kept.

Then, in step S23, the touch-controlling unit 23 determines whether the user touches the touch panel 13 after the volume of sounds to be produced is decreased. When the touch-controlling unit 23 detects the user's touch on the touch panel 13, the process proceeds to step S24 where the touch-controlling unit 23 sends a command signal for generating vibrations to the vibration-controlling unit 14 in response to the user's touch on the touch panel 13 to vibrate the touch panel 13. Then, the vibration-controlling unit 14 vibrates the touch panel 13 at a predetermined frequency to inform the user that the user's operation on the touch panel 13 is recognized upon receiving the command signal. At this time, the magnitude of the vibrations generated as force feedback is larger than that for producing the sounds.

Then, in step S25, the volume-adjusting unit 28 determines whether a predetermined time, for example, five seconds, elapses after the sound volume is decreased. When the predetermined time does not elapse, the process returns to step S23, and steps S23 and S24 are repeated. On the other hand, when the predetermined time elapses, the process proceeds to step S26 where the volume-adjusting unit 28 sets the sound volume to its original state. Moreover, when the predetermined time elapses without the user's operation on the touch panel 13 after the sound volume is decreased, the volume-adjusting unit 28 sets the sound volume to its original state. Then, the process returns to step S21, and the process described above is repeated.

As described above, in the third embodiment, the volume of sounds to be produced is decreased so that the magnitude of the vibrations for producing the sounds is less than that for providing force feedback, upon detecting the user's operation on the touch panel 13 through the infrared sensor 11. That is, for example, when the user brings his or her finger close to the touch panel 13 to operate the touch panel 13, the infrared sensor 11 detects this operation. Then, the sound volume is automatically decreased so that the magnitude of the vibrations of the touch panel 13 for providing force feedback is larger than that for producing the sounds. Thus, the vibrations representing force feedback can be smoothly provided to the user without operating a hardware key other than the touch panel 13 even while the touch panel 13 is used as a speaker.

In the case described above, the magnitude of the vibrations for producing the sounds is decreased by decreasing the sound volume. Alternatively, the magnitude of the vibrations for force feedback may be increased from the normal level while the sounds are being produced, upon detecting the user's operation on the touch panel 13. Otherwise, the magnitude of the vibrations for producing the sounds may be decreased and the magnitude of the vibrations for force feedback may be increased from the normal level at the same time.

Figure 11:
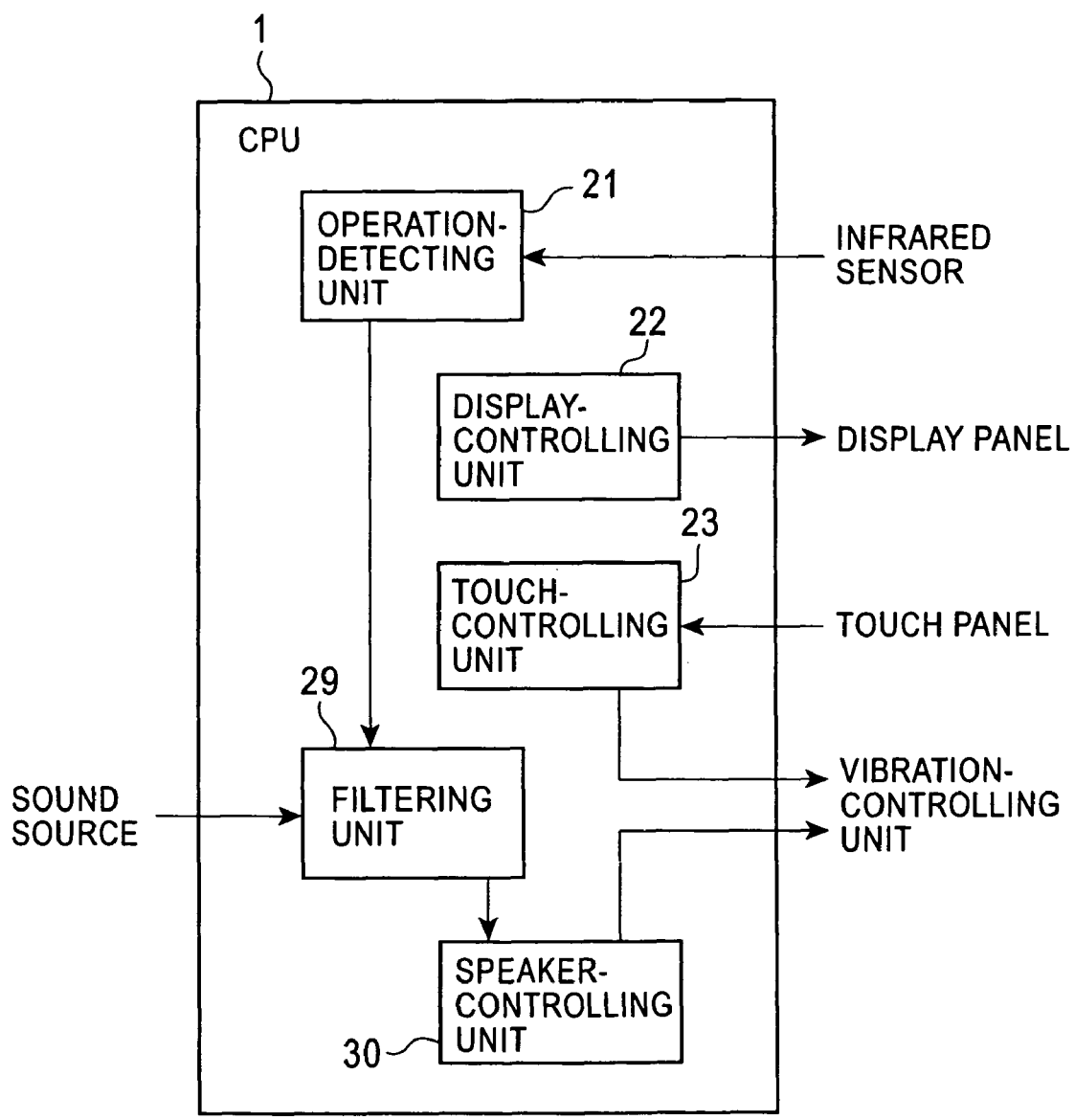
FIG. 11 is a block diagram illustrating the structure of a typical CPU according to a fourth embodiment.

A fourth embodiment according to the present invention will now be described with reference to the drawings. The structure of a touch-panel input device having a function for providing vibrations according to the fourth embodiment is the same as that shown in FIG. 1. FIG. 11 is a block diagram illustrating the structure of a typical CPU 1 according to the fourth embodiment. The layout of an infrared sensor 11 according to the fourth embodiment is the same as that shown in FIGS. 3A and 3B.

As shown in FIG. 11, the CPU 1 according to the fourth embodiment includes an operation-detecting unit 21, a display-controlling unit 22, a touch-controlling unit 23, a filtering unit 29, and a speaker-controlling unit 30. Since the structure of the CPU 1 is the same as that shown in FIG. 2 except for the filtering unit 29 and the speaker-controlling unit 30, a duplicated description is omitted.

In the fourth embodiment, there is no switching operation between the input operation mode (the FFB mode) and the speaker mode described above. A vibration-controlling unit 14 according to the fourth embodiment shown in FIG. 1 controls both vibrations of a touch panel 13 for producing sounds as a speaker and vibrations of the touch panel 13 for providing force feedback. The vibration-controlling unit 14 vibrates the touch panel 13 upon detecting a user's touch on the touch panel 13, and vibrates the touch panel 13 at a frequency corresponding to sounds to be produced when the touch panel 13 is used as a speaker.

When the touch panel 13 vibrates for producing sounds and when the operation-detecting unit 21 detects the user's operation on the touch panel 13, the filtering unit 29 removes a frequency band of vibrations for providing force feedback in response to the user's touch on the touch panel 13 from a frequency band of the sounds to be produced. When the user does not operate the touch panel 13, the filtering unit 29 does not perform this frequency-band removing process and supplies the entire frequency band of the sounds to the speaker-controlling unit 30.

The speaker-controlling unit 30 sends the vibration-controlling unit 14 a command signal for generating vibrations to vibrate the touch panel 13 at a frequency corresponding to sounds to be produced, based on audio signals supplied from a sound source in an electronic device through the filtering unit 29.

Figure 12:
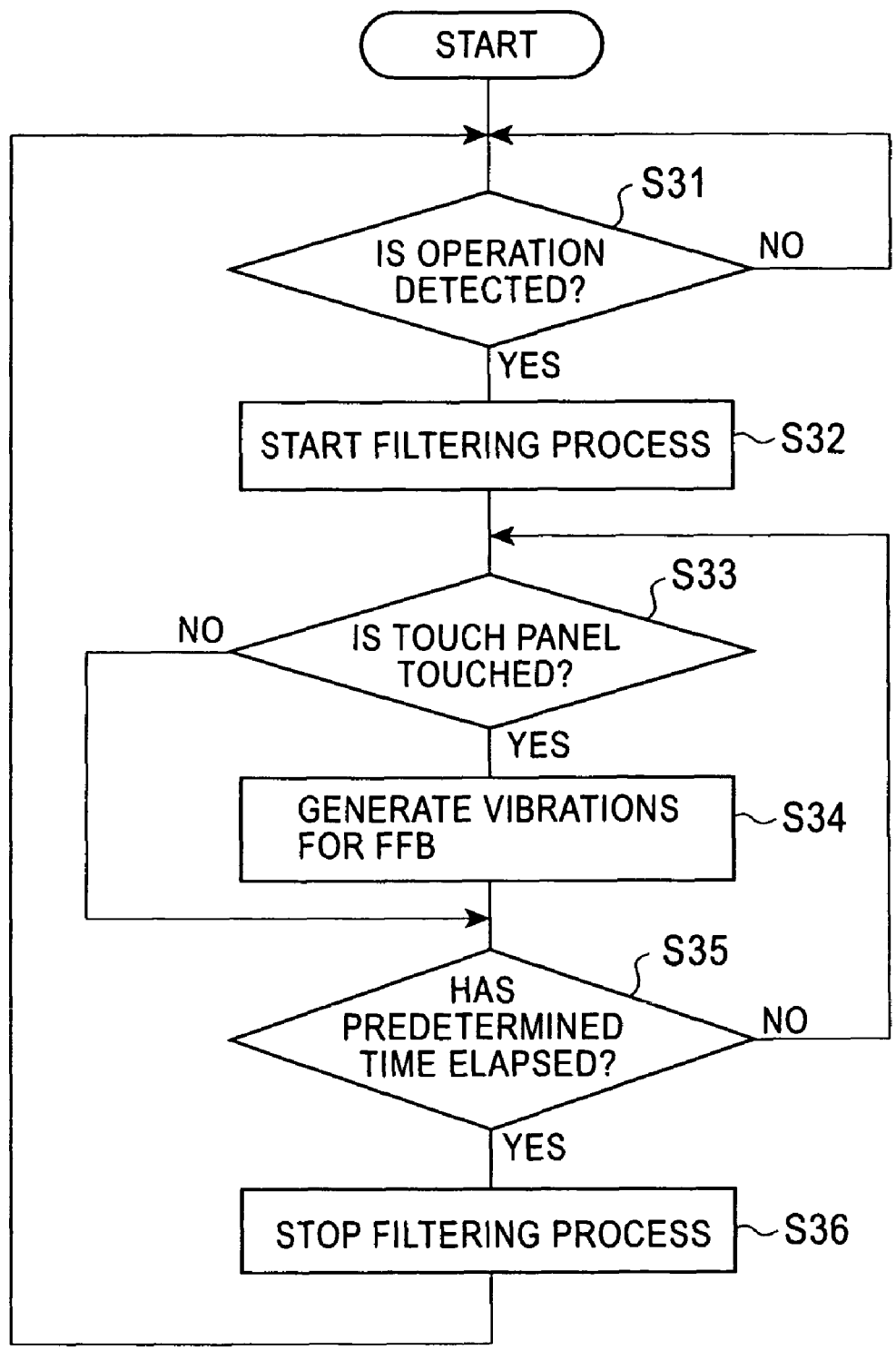
FIG. 12 is a flowchart illustrating a process for generating vibrations in response to a user's input operation according to the fourth embodiment.

The operation of the touch-panel input device according to the fourth embodiment will now be described. FIG. 12 is a flowchart illustrating a process for generating vibrations in response to the user's input operation according to the fourth embodiment. In step S31, the filtering unit 29 determines whether the operation-detecting unit 21 detects the user's operation on the touch panel 13.

When it is determined that the user does not operate the touch panel 13, step S31 is repeated. In this repetitive process, when the sound source in the electronic device supplies audio signals to the speaker-controlling unit 30 through the filtering unit 29, the vibration-controlling unit 14 generates vibrations on the touch panel 13 in response to the audio signals to produce sounds from the touch panel 13. These sounds to be produced are not subjected to the filtering process in the filtering unit 29 and have the original frequency band.

On the other hand, when it is determined that the user operates the touch panel 13 in step S31, the process proceeds to step S32. In step S32, the filtering unit 29 performs the filtering process on the audio signals supplied from the sound source in the electronic device to remove the frequency band of vibrations for providing force feedback in response to the user's touch on the touch panel 13 from the frequency band of the sounds to be produced.

Then, in step S33, the touch-controlling unit 23 determines whether the user touches the touch panel 13 after the filtering process is performed on the sounds to be produced. When the touch-controlling unit 23 detects the user's touch on the touch panel 13, the process proceeds to step S34 where the touch-controlling unit 23 sends a command signal for generating vibrations to the vibration-controlling unit 14 in response to the user's touch on the touch panel 13 to vibrate the touch panel 13. Then, the vibration-controlling unit 14 vibrates the touch panel 13 at a predetermined frequency to inform the user that the user's operation on the touch panel 13 is recognized upon receiving the command signal. At this time, the frequency band of sounds to be produced does not include the frequency band of vibrations generated for force feedback.

Then, in step S35, the filtering unit 29 determines whether a predetermined time, for example, five seconds, elapses after the filtering process is started. When the predetermined time does not elapse, the process returns to step S33, and steps S33 and S34 are repeated. On the other hand, when the predetermined time elapses, the process proceeds to step S36 where the filtering unit 29 stops the filtering process. Moreover, when the predetermined time elapses without the user's operation on the touch panel 13 after the filtering process is started, the filtering unit 29 stops the filtering process. Then, the process returns to step S31, and the process described above is repeated.

As described above, in the fourth embodiment, the frequency band of vibrations for force feedback is removed from the frequency band of vibrations of the sounds to be produced, upon detecting the user's operation on the touch panel 13 through the infrared sensor 11. Thus, the vibrations of the touch panel 13 for force feedback are clearly distinguished from the vibrations of the touch panel 13 for producing the sounds. Accordingly, the vibrations for force feedback can be smoothly provided to the user without operating a hardware key other than the touch panel 13 even while the touch panel 13 is used as a speaker.

In the first to fourth embodiments, the operation detector includes the infrared sensor 11. Alternatively, a sensor using other electromagnetic waves, for example, visible rays or microwaves may be used instead of the infrared sensor 11. Preferably, infrared rays or microwaves are used instead of visible rays because electromagnetic waves emitted from the sensor pass across the front surface of the display panel 12 due to the layout of the sensor.

In the first to fourth embodiments, the infrared sensor 11 includes the infrared-emitting units 11a and the infrared-receiving units 11b. However, the present invention is not limited to these embodiments. For example, only the infrared-receiving units 11b can be used to detect a user's operation. A human body emits a very small amount of infrared rays having a wavelength distribution corresponding to its temperature. Thus, the user's operation can be detected by detecting a change in the infrared rays using the infrared-receiving units 11b when the user brings his or her finger close to the touch panel 13. In this case, the infrared-receiving units 11b may be a thermal infrared sensor having a wide wavelength band or a quantum-type infrared sensor having a high sensitivity.

Instead of the infrared sensor 11, a heat sensor detecting thermal radiation from the user's finger may be used. In this arrangement, the user's operation can be detected by detecting a change in temperature using this heat sensor when the user brings his or her finger close to the touch panel 13. Specifically, it is determined that the user operates the touch panel 13 when the heat sensor disposed close to the touch panel 13 detects an increase in temperature around the touch panel 13.

Instead of the infrared sensor 11, a motion sensor detecting a three-dimensional motion of an object in a space may be used. For example, this motion sensor includes a three-dimensional image sensor for detecting a three-dimensional position of an object in a space and a motion detector for detecting a three-dimensional motion of the object by monitoring a change in position data periodically sent from the three-dimensional image sensor. Functions of this motion detector may be implemented by the CPU 1.

In a case where the motion sensor is used, it is determined that a user operates the touch panel 13 when a predetermined motion of the user in a space is detected. This motion of the user is, for example, the movement of a pointing instrument such as the user's finger toward the touch panel 13 within a predetermined coordinate space with respect to the touch panel 13 at a speed exceeding a predetermined speed. This motion sensor can detect the user's operation at locations close to and slightly away from the touch panel 13, thereby improving user operability.

The motion sensor is not limited to that including the three-dimensional image sensor described above. Alternatively, the motion sensor may include a three-axis gyro, an acceleration sensor, or a magnetic sensor, and a pointing device may include this motion sensor. The motion sensor detects a predetermined motion of the user based on an absolute value of orientation, rotational momentum, or gradient of an object that are detected when the user operates the pointing device. In this arrangement, when the motion sensor detects the predetermined motion, it is determined that the user operates the touch panel 13.

Instead of the infrared sensor 11, a touch sensor (not shown) included in the touch panel 13 may be used. In this arrangement, when the touch sensor detects a user's touch on the touch panel 13, it is determined that the user operates the touch panel 13.

When the touch sensor is applied to the operation detectors according to the first and second embodiments, it is preferable that the operation mode is changed only after the user touches the touch panel 13 for the first time (force feedback is not provided at this time) and force feedback is provided after touching a second time, because of the following reasons. When the user touches the touch panel 13 for the first time, the operation mode is still set to the speaker mode or the microphone mode. Thus, at this time, in the speaker mode, force feedback is not smoothly provided to the user, and in the microphone mode, vibrations for force feedback may be erroneously transmitted as voice input.

In contrast, when the touch sensor is applied to the operation detectors according to the third and fourth embodiments, force feedback can be provided at the first time when the user touches the touch panel 13.

The embodiments according to the present invention are described above only for illustrative purposes and do not limit the technical scope of the present invention. That is, the present invention may be embodied in other specific forms without departing from the spirit or essential characteristics thereof.

What is claimed is:

1. A touch-panel input device having a function for providing vibrations, the device comprising:
    a touch panel for receiving an operation on an operation item displayed on a display panel;
    an operation detector for detecting an operation on the touch panel; and
    a vibration-controlling unit for vibrating the touch panel for providing force feedback upon detecting an operation on the touch panel and for vibrating the touch panel so as to produce sounds;
    wherein the sounds produced by vibrating the touch panel are generated from audio signals supplied by a sound source, the volume of sounds produced by vibrating the touch panel is adjustable by an operator, and when the magnitude of vibrations for producing the sounds is greater than the magnitude of vibrations for force feedback, the vibration-controlling unit controls the magnitude of vibrations so that the magnitude of vibrations for producing the sounds is less than the magnitude of vibrations for force feedback in response to a touch of the operator on the touch panel while the touch panel vibrates to produce the sounds, upon detecting an operation on the touch panel by the operation detector.

2. The touch-panel input device according to claim 1, further comprising:
    an operation-mode controlling unit for setting an operation mode of the touch panel to either an input operation mode for vibrating the touch panel by the vibration-controlling unit upon detecting an operation on the touch panel or a microphone mode for allowing voice input by transmitting vibrations generated on the touch panel when the operator speaks to the touch panel, the operation-mode controlling unit changing the operation mode to the input operation mode when the operation mode is set to the microphone mode upon detecting an operation on the touch panel by the operation detector.

3. A touch-panel input device having a function for providing vibrations, the device comprising:
    a touch panel for receiving an operation on an operation item displayed on a display panel;
    an operation detector for detecting an operation on the touch panel;
    a filtering unit for selectively performing a filtering process on audio signals supplied from a sound source; and
    a vibration-controlling unit for vibrating the touch panel for providing force feedback upon detecting an operation on the touch panel and for vibrating the touch panel so as to produce sounds based on the audio signals;
    wherein, upon detecting an operation on the touch panel by the operation detector, the filtering unit removes a frequency band of vibrations for force feedback from the frequency band of the sounds to be produced, and the vibration-controlling unit generates the sounds based on a frequency band of vibrations for producing the sounds that does not include a frequency band of vibrations for force feedback in response to a touch of the operator on the touch panel while the touch panel vibrates to produce the sounds, whereas when an operation on the touch panel is not detected by the operation detector, the filtering unit does not remove the frequency band of vibrations for force feedback from the frequency band of the sounds to be produced.

4. The touch-panel input device according to claim 3, wherein the operation detector includes an infrared sensor.

5. The touch-panel input device according to claim 4, wherein
    the infrared sensor includes a plurality of infrared-emitting units disposed along at least one first edge of a housing provided with the touch panel and a plurality of infrared-receiving units disposed along at least one second edge opposing said at least one first edge; and
    the operation detector determines that the operator operates the touch panel when infrared rays emitted from the infrared-emitting units are intercepted by the operator.

6. The touch-panel input device according to claim 3, wherein the operation detector includes a heat sensor and determines that the operator operates the touch panel when the heat sensor detects an increase in temperature around the touch panel.

7. The touch-panel input device according to claim 3, wherein the operation detector includes a motion sensor for detecting a three-dimensional motion of an object in a space and determines that the operator operates the touch panel when a predetermined motion of the operator in the space is detected.

8. The touch-panel input device according to claim 7, wherein the motion sensor includes a three-dimensional image sensor for detecting a three-dimensional position of the object in the space and a motion detector for detecting the three-dimensional motion of the object by monitoring a change in position data supplied from the three-dimensional image sensor.

9. The touch-panel input device according to claim 3, wherein the operation detector includes a touch sensor used with the touch panel and determines that the operator operates the touch panel when the touch sensor detects a touch on the touch panel.

10. A method for providing vibrations for force feedback in response to an input operation on a touch panel, the method comprising:
    vibrating the touch panel to produce sounds based on audio signals supplied by a sound source;
    adjusting a volume of the sounds produced by vibrating the touch panel in response to a request by an operator;
    detecting an operation by an operator on the touch panel;
    when the magnitude of vibrations for producing sounds is greater than the magnitude of vibrations for force feedback, controlling the magnitude of vibrations of the touch panel so that the magnitude of vibrations for producing sounds is less than the magnitude of vibrations for force feedback in response to a touch of an operator on the touch panel when the operation on the touch panel is detected; and
    producing the sounds at the magnitude of vibrations as adjusted in the controlling act and vibrating the touch panel in response to a touch of the operator on the touch panel.

11. The method according to claim 10, wherein it is determined whether the operator operates the touch panel by monitoring a change in received signals using an infrared sensor provided near the touch panel.

12. The method according to claim 10, wherein it is determined whether the operator operates the touch panel by monitoring an increase in temperature around the touch panel using a heat sensor provided near the touch panel.

13. The method according to claim 10, wherein it is determined whether the operator operates the touch panel by monitoring a predetermined motion of the operator within a space using a motion sensor for detecting a three-dimensional motion of an object in a space.

14. A method according to claim 10, wherein it is determined whether the operator operates the touch panel by monitoring a touch on the touch panel using a touch sensor included in the touch panel.

15. A method for providing vibrations for force feedback in response to an input operation on a touch panel, the method comprising:

detecting an operation on the touch panel; and when the operation on the touch panel is detected, removing a frequency band of vibrations for force feedback in response to a touch of an operator on the touch panel from a frequency band of vibrations for producing sounds on the touch panel, and generating sounds having the frequency band other than the removed frequency band and vibrating the touch panel at a frequency in the removed frequency band in response to a touch of the operator on the touch panel;

whereas when an operation on the touch panel is not detected, the frequency band of vibrations for force feedback is not removed from the frequency band of vibrations of sounds to be produced.

16. The method according to claim 15, further comprising:

determining whether an operation mode of a touch panel is set to a microphone mode for allowing voice input by transmitting vibrations generated on the touch panel when an operator speaks to the touch panel;

detecting an operation on the touch panel when it is determined that the operation mode is set to the microphone mode;

changing the operation mode to an input operation mode for vibrating the touch panel in response to a touch of the operator on the touch panel when the operation on the touch panel is detected;

detecting a touch of the operator on the touch panel after the operation mode is changed to the input operation mode; and vibrating the touch panel when a touch of the operator on the touch panel is detected.

\* \* \* \* \*